United States Patent [19]
Todd, Jr.

[11] Patent Number: 5,209,870
[45] Date of Patent: * May 11, 1993

[54] STABLE ALKALINE LABIATAE ANTIOXIDANT EXTRACTS

[75] Inventor: Paul H. Todd, Jr., Kalamazoo, Mich.

[73] Assignee: Kalamazoo Holdings, Inc., Kalamazoo, Mich.

[*] Notice: The portion of the term of this patent subsequent to Oct. 29, 2008 has been disclaimed.

[21] Appl. No.: 554,018

[22] Filed: Jul. 17, 1990

Related U.S. Application Data

[63] Continuation-in-part of Ser. No. 396,530, Aug. 21, 1989, Pat. No. 5,023,017.

[51] Int. Cl.$^5$ ............................................. A61K 35/28
[52] U.S. Cl. ................................... 252/398; 426/542; 426/429
[58] Field of Search ................ 426/542, 429; 252/398

[56] References Cited

U.S. PATENT DOCUMENTS

| | | | |
|---|---|---|---|
| 3,497,362 | 2/1970 | Patron | 426/542 |
| 3,658,557 | 4/1972 | Samejima et al. | 426/542 |
| 3,732,111 | 5/1973 | Berner et al. | 426/655 |
| 3,950,266 | 4/1976 | Chang et al. | 252/398 |
| 4,012,531 | 5/1977 | Viani | 426/431 |
| 4,283,429 | 8/1981 | Todd | 426/250 |
| 4,285,981 | 8/1981 | Todd | 426/250 |
| 4,310,556 | 1/1982 | Suggs et al. | 426/654 |
| 4,310,557 | 1/1982 | Suggs et al. | 426/654 |
| 4,315,947 | 2/1982 | Todd | 426/250 |
| 4,343,823 | 8/1982 | Todd | 426/250 |
| 4,352,746 | 10/1982 | Bracco | 252/398 |
| 4,363,823 | 12/1982 | Kimura | 252/398 X |
| 4,380,506 | 4/1983 | Kimura | 252/398 X |
| 4,450,097 | 5/1984 | Nakatani et al. | 252/404 |
| 4,877,635 | 10/1989 | Todd, Jr. | 426/542 |
| 5,017,397 | 5/1991 | Nguyen et al. | 426/542 |
| 5,023,017 | 6/1991 | Todd, Jr. | 252/398 |
| 5,026,550 | 6/1991 | Aeschbach et al. | 252/398 X |
| 5,043,100 | 8/1991 | Chang et al. | 252/398 |
| 5,061,403 | 10/1991 | Todd, Jr. | 426/542 |

FOREIGN PATENT DOCUMENTS

| | | |
|---|---|---|
| 83847974 | 5/1982 | Japan . |
| 84247484 | 2/1983 | Japan . |
| 2184341 | 6/1987 | United Kingdom . |

OTHER PUBLICATIONS

Derwent Abstract, 67702RD, 7, 27, 66 "Dar-Nippon Sugar Mfg Co. Ltd., Preservable Emulsifying Composition For Foods".

Primary Examiner—Richard D. Lovering
Assistant Examiner—Valerie Fee
Attorney, Agent, or Firm—Gordon W. Hueschen

[57] ABSTRACT

A process of preparing an alkaline solution of Labiatae antioxidants essentially free of lipids by agitating a solvent extract of the herb with an aqueous alkaline lower-aliphatic alcoholic or polyol solution thereof, separating the aqueous phase from the insoluble phase, and removing the alcohol from the aqueous phase by distillation to give a stable product with an antioxidant strength of 0.2 or more, having a pH above about 8.4, and having less than 75% water, preferably in the presence of a water-immiscible solvent, and a stable aqueous antioxidant solution of a Labiatae extract, consisting essentially of essentially all of the antioxidant substances present in the herb, which is preferably rosemary, sage, or thyme, with an antioxidant strength of 0.2 or more, and less than about 75% water, preferably having a pH between about 8.4 and about 11.8, and therefore useful for a wide variety of antioxidant purposes, including use in can liners and aqueous alkaline epoxy emulsions for preparing the same, are disclosed.

8 Claims, No Drawings

STABLE ALKALINE LABIATAE ANTIOXIDANT EXTRACTS

This application is a continuation-in-part of my prior-filed copending application, Ser. No. 396,530 filed Aug. 21, 1989, now U.S. Pat. No. 5,023,017.

BACKGROUND OF THE INVENTION AND PRIOR ART

1. Field of Invention

Stable alkaline Labiatae extracts in the form of aqueous alkaline solutions which contain essentially all of the antioxidant substances present in the herb and which, for stability, must have an antioxidant strength of at least 20% of pure butylated hydroxy toluene (BHT), less than about 75% water, and a pH above about 8.4 and below about 11.8. Previously, no stable aqueous alkaline solutions of Labiatae extracts have been known.

2. Background of the Invention and Prior Art

Herbs which are members of the Labiatae family have been used for culinary purposes since time immemorial. This botanical group, commonly known as the mint family, includes not only peppermint and spearmint, but also sage, thyme, rosemary, marjoram, catnip, and others. These herbs have been used for both their flavoring and preserving qualities, sage and rosemary in particular being widely used in pork, sausage and poultry seasonings to retard rancidity. In herbal dressings and sauces, marjoram, thyme, and the mints are used for the same purpose.

Until modern technology was able to make herbal extracts which retained both the flavor and antioxidant-preservative qualities of the parent herb from which they were derived, the extracts played a very small role in seasonings in the food industry. Now, however, it is possible to make herbal extracts which are stable, uniform in flavor, sterile, and without extraneous matter such as sticks and sand, and which retain the desired flavoring components of the dried herb. As a result, these extracts are becoming more and more widely used in the food processing industry.

These extracts are commonly known as oleoresins. They are made by percolating the herb with an approved food-grade solvent such as a lower alcohol (methanol, ethanol, isopropanol), a lower-alkyl ketone (acetone, methyl ethyl ketone), petroleum ether (hexane, etc.), and less preferably with a chlorinated solvent such as methylene chloride or ethylene dichloride. Extraction temperatures range from ambient up to the boiling point of the solvent, and generally the herb is exhaustively extracted insofar as the given solvent is concerned. A solvent such as ethanol will tend to extract more glycolipids and sugars than a ketone or chlorinated solvent, which in turn are more powerful solvents and less selective than hexane.

Although the crude oleoresin is suitable for many purposes, it is often refined to remove chlorophyll by charcoal adsorption and perhaps washed with water to remove sugars. If may often be subjected to vacuum distillation to remove undesirable aromas present in the natural herb, such as dimethyl sulfide and terpene hydrocarbons. In the case of rosemary, Chang (U.S. Pat. No. 3,950,266) describes a distillation process which will remove camphor, which is often an undesirable component, and the desirable rosemary aromas remain in the refined oleoresin if the procedure is terminated at the proper time.

Because rosemary is the member of the mint family on which the most effort on refining has been expended, the prior art is best exemplified by discussing the kinds of products which have been made from it, and the procedures by which they have been obtained. The same types of products and procedures apply equally well to other Labiatae.

Crude oleoresin rosemary, made by using the FDA-approved solvents already described, is available in many forms, such as the semisolid, resinous straight extract, an extract homogenized with an edible carrier such as vegetable oil or emulsifier, or in the form of an oil and water-dispersible blend as described in Todd (U.S. Pat. Nos. 4,283,429; 4,285,981; 4,315,947; and 4,343,823). All of these forms induce a haze or precipitate when added to a vegetable oil at the level of use (usually about 1 to 5,000), and they will throw precipitates which do not redissolve upon standing. By the method of Chang they may, however, be standardized as to the desired flavoring effect and undesirable odoriferous materials removed. They are not water soluble.

The antioxidant power of rosemary has been known and studied for many years. Specific compounds have been identified which have antioxidant properties, and among these are carnesol, carnosic acid, rosmaridiphenol, and rosmanol.

The latter compound was patented by Nakatani (U.S. Pat. No. 4,450,097). Weight for weight, these compounds are about as effective as the present synthetic antioxidants used in food. However, the known and described substances are only a small fraction of the total antioxidant materials present in rosemary and, from an economic point of view, their separation from the other active substances in the extract does not make sense.

A method of extracting rosemary not dependent upon an organic solvent, but rather using water at a pH of preferably about 8.6, is described in Viani (U.S. Pat. No. 4,012,531). Using water as a solvent avoids the expense of an organic solvent, but it also extracts glycolipiids and sugars, etc., and his extract therefore contains substances unwanted in many applications. He limits his pH to below 10.5. At the preferred pH described in his examples, only about 60 to 70% of the antioxidant materials are recovered.

Viani uses about ten parts of water to one part of rosemary for his extraction, so his solution is very dilute (the antioxidant is present at 1% or less in the water). The murky water dispersion may be used immediately, but within a few days it loses its antioxidant power. An obvious explanation is that the polyphenolic substances with structures like rosmanol, carnesol, carnosic acid, etc., are unstable in such dilute alkaline solutions. Perhaps to overcome this lack of stability, Viani suggests precipitation of the antioxidant materials by prompt acidification of the alkaline extract, and separation of the precipitate. This acidified precipitate is stable, but dissolves in fats only partially even upon intense heating and stirring with precipitation developing on cooling, and is not soluble or dispersible in water, but may be partially redispersed on the addition of base. A third alternative is to evaporate the water, leaving an alkaline solid which shares the instability of his alkaline water solution. It is not soluble in fats at any temperature, and cannot be redissolved in water to form a clear precipitate-free solution.

Paton (U.S. Pat. No. 3,497,362) describes making either a powdered crude extract of rosemary, or an ethanolic solution of a crude extract, and dispersing either the acidic powder or the dilute ethanolic solution of the acidic powder in phosphate solution, which in turn is used to improve the quality of vegetables upon drying. His powder, similar to, the acidified powder of Viani, provides a means for storing the active antioxidants in stable form. The uniquely stable alkaline product of this invention permits admixing with phosphate to give a solution rather than a dispersion, and without extraneous insoluble substances, and without losing stability even though it is in liquid form.

Nakatani (U.S. Pat. No. 4,450,097, previously cited) combines the solvent extraction technique of preparation of the oleoresin with Viani's technique of aqueous extraction, to prepare both a highly concentrated fraction of the antioxidants, as well as to prepare rosmanol. In his examples, he extracts rosemary with hexane at ambient temperature, which removes about 60% to 70% of the antioxidant factors present in the rosemary. This fraction of the natural antioxidants of the rosemary is then subjected to further fractionation by serial extraction with aqueous acid (to give a basic fraction), with bicarbonate at a pH of about 8.6% (to give a highly acidic fraction), and finally with alkali at a pH of about 11.5. This alkali-soluble fraction (called a weakly-acidic fraction) is separated from the so-called neutral fraction (acidic and basic insoluble fraction). The basic, highly acidic, and neutral fractions, all containing selected portions of the antioxidants present in rosemary, are discarded. The weakly-acidic fraction, containing the antioxidant compound of interest to Nakatani, is recovered from the alkali system by prompt acidification and extraction with ether and is considered his inventive antioxidant. He obtains 1.9 g of this material from 500 g of rosemary and from it isolates rosmanol. His yield is less than 3–4% of the total antioxidants present in the herb.

Nakatani, in describing the weakly-acidic fraction as requiring strong alkali (pH about 10.5, and preferably about 11.5, and using 4 extractions with 150 ml of 1N NaOH to solvate 1.9 g of the fractions in his example) explains why Viani could not extract all the antioxidant in his examples at his lower pH of about 8.6. The low solubility in aqueous alkali (less than 1.9 g/150 ml) is also apparent.

Although Nakatani does not refer to the instability of his 1.3% aqueous alkaline solution, it is necessary to recover the antioxidant from it immediately since it loses its activity in a matter of days. The explanation offered for the instability of Viani's solution applies here also.

In summary, the prior art shows that selected portions of the antioxidants present in rosemary are soluble at a level of not more than about 1% to 2% in aqueous media, at a pH of above about 8.5, more preferably above about 11.5. These preparations of antioxidants have been found to lose their antioxidant activity rapidly while in an alkaline solution. The same conclusions can be drawn for other Labiatae antioxidant preparations.

The art is replete with procedures for preparing and refining rosemary extracts. Kimura (U.S. Pat. No. 4,363,823) makes an alcohol extract, which, when added to boiling water, is separated from hydroscopic water-soluble substances and becomes a dry, insoluble powder upon cooling. This makes it similar in its constituents to a crude extract made with a less polar solvent, such as acetone or hexane. Berner (U.S. Pat. No. 3,732,111) extracts sage with an edible fat, removes volatiles with steam, and uses the extract in fat as an antioxidant. Chang (U.S. Pat. No. 3,950,266) describes a procedure for deodorization of rosemary extract in the presence of a nonvolatile edible oil. Bracco (U.S. Pat. No. 4,352,746) describes a process for carbonizing an extract which enables it to be deodorized and concentrated by molecular distillation. Kimura (U.S. Pat. No. 4,380,506) describes a technique for separating oil-soluble and oil-insoluble antioxidant fractions from an extract by using alcohol-water mixtures in the presence of hexane, and the efficacy of the oil-insoluble fraction as a bactericide. Hasegawa (Jap. patents 83-847974 and 84-247484) describes a process for deodorization of a solvent extract of an herb in the presence of an absorbent, and the concentration of the extract and washing with 20% to 50% solutions of methanol or ethanol for deodorization purposes. Of the prior art, only Nakatani and Viani suggest the use of alkaline pH's in their separation and deodorization procedures, and both of these investigators required the prompt neutralization of the aqueous alkaline extracts to recover the active principles in a stable acidic form.

OBJECTS OF THE PRESENT INVENTION

It is object of the present invention to provide a stable aqueous alkaline antioxidant solution of a Labiatae extract, consisting essentially of all of the antioxidant substances present in the herb, and which is essentially free of lipids present in the herb, and a process for the production thereof. Another object of the invention is to provide such a stable aqueous antioxidant solution of a Labiatae extract wherein the solution has an antioxidant strength of 20% or more of BHT, and less than about 75% water, and has a pH between about 8.4 and about 11.8, preferably between about 8.7 and 11.2. A further object of the invention is to provide such a solution in a solvent selected from lower-aliphatic alcohols or polyols, such as propylene glycol and glycerine, or mixtures thereof. Another object of the invention is to provide such a stable aqueous alkaline antioxidant solution wherein the extract is derived from rosemary or sage. Another object of the invention is the provision of an aqueous alkaline epoxy emulsion having antioxidant properties and consisting essentially of the epoxy emulsion and natural antioxidants derived from a Labiatae herb, especially rosemary or sage, and essentially free of lipids present in the herb, and a can liner characterized by the ability to impart improved stability and resistance to the development of off-flavors to the can liner and the contents of the can, consisting essentially of an epoxy emulsion and natural antioxidants derived from a Labiatae herb. Other objects of the invention will become apparent hereinafter and still others will be obvious to one skilled in the art to which this invention pertains.

SUMMARY OF THE INVENTION

The invention, then, comprises inter alia the following, singly or in combination:

A process of preparing an alkaline solution of Labiatae antioxidants essentially free of lipids by agitating a solvent extract of the herb with an aqueous alkaline lower-aliphatic alcoholic or polyol solution thereof, separating the aqueous phase from the insoluble phase, and preferably but not necessarily removing the alcohol from the aqueous phase by distillation to give a stable aqueous product with an antioxidant strength at least 20% of pure BHT, having a pH above about 8.4, and having less than 75% water; such a process conducted in the presence of a water-immiscible solvent; such a process for preparing a stable alkaline solution containing essentially all of the antioxidant principles of a Labiatae extract by preparing a solution of the extract in a medium selected from aqueous alkaline lower-aliphatic alcohol and polyol media which includes the steps of admixing an organic solvent extract of the herb with an alkaline solution, removing insoluble lipids and resins, adjusting the resulting pH to above about 8.4 and the antioxidant strength to above 20% of that of pure BHT, and adjusting the water content to less than 75%; such a process conducted in the presence of a water-immiscible solvent; such a process wherein the medium comprises propylene glycol, glycerine, ethanol, or mixtures thereof; such a process of extracting a Labiatae herb with an organic solvent, decolorizing the extract with an absorbent, removing the acetone-insoluble materials therefrom, deodorizing the product, admixing the product with a lower-aliphatic alcohol, polyol, and/or water at an alkaline pH, removing the lipids therefrom, and concentrating the alkaline phase to give a stable product having an antioxidant strength above 20% of BHT, such a process wherein an added polyol ester is present; and such a process wherein the herb is selected from the group consisting of rosemary, sage, and thyme.

Also a stable aqueous alkaline antioxidant solution of a Labiatae extract, consisting essentially of essentially all of the antioxidant substances present in the herb, more than about 0.2 antioxidant strength, and less than about 75% water; such a stable aqueous solution of Labiatae herb antioxidants in a lower-aliphatic alcohol or polyol, or a mixture thereof, at a pH between about 8.4 and about 11.8, and an antioxidant strength of at least 0.2 and less than about 75% water; such a stable aqueous solution of Labiatae herb antioxidants in propylene glycol; such a stable aqueous solution wherein the antioxidants are derived from rosemary, sage, or thyme; such a stable aqueous solution, comprising also a lipophilic-scavengering polyol ester; and such a stable aqueous solution, comprising also a polyphosphate.

Moreover, an aqueous alkaline epoxy emulsion having antioxidant properties consisting essentially of the epoxy emulsion and natural antioxidants derived from a Labiatae herb and essentially free of lipids present in the herb; such an aqueous alkaline epoxy emulsion, wherein the natural antioxidants are derived from rosemary, sage, or thyme; and a can liner, characterized by the ability to impart improved stability and resistance to the development of off-flavors to the can liner and to contents of a can lined therewith, consisting essentially of a water-based epoxy emulsion and natural antioxidants derived from a Labiatae herb; such a can liner wherein the natural antioxidants derived from rosemary, sage, or thyme; such a can liner wherein the natural antioxidants are introduced into the can liner before curing thereof; and such a can liner wherein the natural antioxidants are sprayed onto the can liner after curing of the can liner.

It has been found that stable alkaline solutions, containing essentially all of the natural antioxidants present in the Labiatae herb, can be prepared. To be stable, these solutions surprisingly must have an antioxidant strength of 0.2 or more (20% of pure BHT), they must contain less than 75% water, and the pH must be above about 8.4. The solutions may be made using a lower-aliphatic alcohol, e.g., a lower-alkanol having 2 to 8 carbon atoms, inclusive, such as ethanol, isopropanol, butanol, hexanol, or cyclohexanol, or a substituted lower-aliphatic alcohol such as benzyl alcohol, or the like, or an edible polyol such as propylene glycol or glycerine, or combinations thereof. Ethanol, propylene glycol, glycerine, and mixtures thereof are preferred. These solutions may be added directly to a food, such as a soup, or they may be dispersed on a solid carrier, such as dextrose, or they may be mixed and dissolved in a curing medium such as a polyphosphate solution which is subsequently contacted with a meat, such as beef, poultry, ham, or fish.

The preparations are preferably made from a solvent extract of the herb, from which undesired aromas have been removed by the method of Chang. Furthermore, most preferably, acetone-insoluble materials comprising also the pro-oxidant materials are removed from the extract by the method described in my copending U.S. application Ser. No. 111,918, now U.S. Pat. No. 4,877,635, issued Oct. 31, 1989, or corresponding British application, GB 2 184 341 A, published 24 Jun. 1987, the disclosure of which is incorporated herein by reference, and the chlorophyll has been removed by adsorption on charcoal.

The inventive product is preferably made by direct extraction of the herbal extract into the polar alkaline medium, at a temperature high enough to liquify the resinous extract, and the pH is maintained at the desired level by titration with alkali, preferably KOH or NaOH.

The alkaline solution is then separated from the insoluble liquid phase, and filtered to remove any precipitate. Neither the insoluble liquid phase nor the precipitate necessarily contain antioxidants.

The aroma and flavor of the alkaline solution may be controlled by terminating the deodorization of the crude extract by the method of Chang at any desired point, preferably before the alkaline extraction.

This invention therefore differs from the prior art in the following critical respects:

A. The process of preparation involves the separation of a concentrated solution of the antioxidant materials, preferably all of them present in the original herb or herbal extract, at an alkaline pH, into a polar alcohol or polyol and preferably in the presence of water. The undesired lipids and resins, which inhibit water solubility, are effectively removed.

B. The antioxidant product is stable, is of a concentration comparable to or greater than that of commercial synthetic antioxidant preparations, and is readily soluble in alkaline water solutions, e.g., a polyphosphate solution, or a bicarbonate solution. It, therefore, is uniquely applicable to aqueous systems, since commercial prior art preparations have been directed at oil solubility whereas the compositions of the present invention are not, but rather directed to stable aqueous alkaline solutions of the Labiatae antioxidants.

The product is particularly well adapted to the following applications, where flavor stability is at risk:

1. Combinations with polyphosphates in the pumping or brining of meats, to inhibit warmed over flavor, and to retard off-color development.
2. Aqueous rinses of meats and fish.
3. In citrus and other beverages, to retard off-flavor development, as well as fading of carotenoid colors.
4. Addition to water-based coatings and films, such as epoxy resins, to prevent oxidation of residual lipids on the can coating, with impairment of beverage flavor.
5. High temperature systems, in which the unique heat stability of the Labiatae extracts resists evaporation even while the liquid medium evaporates, such as extracted and puffed foods.
6. Water based synergic systems, combining the herb extract with the alkaline solutions of citric acid or EDTA.
7. Water rinses of vegetables and roots prior to drying.

None of the prior art preparations are as suitable for these applications.

The product of this invention is novel in that, contrary to the teaching of the prior art, it is stable at alkaline pH's.

It is also novel in that it preferably contains essentially all of the antioxidant materials present in the starting herb, it preferably does not contain acetone-insoluble substances which include pro-oxidant substances, and it is soluble in water at alkaline pH's even in the absence of emulsifiers.

Methodology for Evaluation of Antioxidant Activity

An accepted method of evaluating the ability to retard rancidity of a given preparation is to measure the "induction period" of a standard substrate, such as soy bean oil, in a Rancimat TM, using standard conditions of temperature and air flow. All comparisons contained in the Examples are derived from Rancimat TM data, using 130 iodine value soy oil with an induction time of about 190 minutes, at 120° C. and 18 liters of air/hour.

Since Rancimat TM data provide information on how much longer a treated oil resists rancidity, as compared to the control, these data permit comparison with synthetic antioxidants.

Butylated hydroxy toluene (BHT) is a commonly used synthetic antioxidant, approved for food use at a level of 0.02%. Therefore, the antioxidant strengths of the inventive preparations can be compared with that of BHT using the Rancimat TM procedure as follows: A 0.10% solution of BHT in a 130 iodine value soy oil increases the induction time from 187 to 226 minutes. The product of Example 1, at a concentration of 0.07% (acidified into soy oil) has an equal induction time of 226 minutes. Its antioxidant strength (AOS) compared to BHT is therefore $0.10/0.07 = 1.42$. In other words, one pound of the Example 1 product has about 1.4 times as much antioxidant strength as one pound of BHT, the standard BHT being taken as having an AOS of one (1). An alkaline rosemary product, with an AOS of 0.2, therefore has the same antioxidant strength as a commercially available 20% solution of BHT.

DETAILED DESCRIPTION OF THE INVENTION

The following preparations and Examples are given by way of illustration only, and are not to be construed as limiting.

EXAMPLE 1

Preparation of a Stable Alkaline Rosemary Extract—A Preferred Embodiment

This example shows the direct extraction of the rosemary with a preferred solvent (acetone) and the conversion of the extract into a stable alkaline water-soluble liquid containing essentially all of the herbal antioxidants, and without pro-oxidant materials.

Sixty grams (60 g) of ground rosemary were extracted exhaustively with acetone in a Soxhlet. The extract in the pot was cooled to ambient (18° C.), 1.5 g charcoal added, agitated 1 hour, and then the acetone insolubles and the charcoal were removed by filtration, as further described in my above-identified British Specification. The acetone solution was then evaporated on a Rotovap TM, 10 ml of water was introduced, and this in turn evaporated at 70 degrees C., under low vacuum to steam distill off the mono-terpenes. The resulting product had a very mild, rich rosemary aroma, and weighed 9.89 g. It contained all of the antioxidant and essentially none of the pro-oxidant factors of the original herb, none being left in the exhausted herb or in the acetone insolubles present in the filter cake.

Then 39.6 g of propylene glycol were added to the extract and it was fluidized at 70 degrees C. 3.2 ml of 10% KOH were then added, to reach a pH of 9.1. The phases were allowed to cool, and the upper fat phase removed. The lower propylene glycol phase was then filtered to remove entrained material, washed with hexane to remove lipids, desolventized, and was a clear brownish solution. It contained essentially all of the starting antioxidant materials. Other solvents, such as hexane, methyl ethyl ketone, lower alcohols, etc., can also be used for the extraction of the herb. As shown in later examples, glycerine, ethanol, and some water can be substituted for the propylene glycol. However, because of its viscosity, solvent power, and nonflammability, propylene glycol containing up to 75% water is the preferred liquid for the alkaline solution of rosemary antioxidants.

The polar alkaline phase may be washed with a nonpolar solvent to remove residual lipids and aromas if desired. The preparation of this example had an antioxidant strength (AOS) which was 1.42 times that of BHT, and was stable for 16 months, at which time testing was terminated.

It should be mentioned that, if vegetable oil is added to the crude extract, to facilitate deodorization by the method of Chang, it is always desirable to remove residual lipids from the propylene glycol, etc., solution, by washing with hexane, ether, methylene chloride, or the equivalent, or water solubility will be impaired.

Although KOH is the preferred base, NaOH or bicarbonates or carbonates of K or Na may be substituted.

If it is desirable to separate the more oil-soluble and more water-soluble antioxidant fractions, as further described in Example 5 of my aforesaid British specification, the more water-soluble fraction may be made to conform with the product of this invention by the addition of water and base. This permits it to be used in solution in aqueous systems as described herein, particularly upon removal of residual lipids present in the propylene glycol phase.

EXAMPLE 2

Comparison of Process and Product with that of Viani and Nakatani

Viani describes the extraction of rosemary with alkali, at a pH preferably below 10.0. In his Example 1, he uses approximately one liter of 4% bicarbonate solution (pH 10.6) per 100 grams of dried rosemary leaves, and separates the water, the pH having dropped, from the "spent" leaves by centrifugation. Viani's spent leaves contain about 20% to 30% of the original antioxidants. In contrast, Nakatani requires a pH of 11.5 and preferably greater to recover his rosmanol, a pure antioxidant compound found in rosemary.

Viani's aqueous solution has an AOS of about 2 to 3% of BHT, and the solution lost its antioxidant activity (by Rancimat TM analysis) within a month while standing in solution. To overcome this difficulty, Viani suggests either acidifying the aqueous solution and thereby preparing a powder partially soluble in very hot fat, or removing the water to permit preparation of an alkaline powder mixed with emulsifiers and other adjuvants which can be used in potato cooking.

Nakatani makes a crude extract of the rosemary with an organic solvent, and separates and discards the more strongly-acidic fractions of antioxidants from his desired weakly-acidic fraction by using base at a pH of less than 10.5, and then extracts his desired fraction at a much higher pH of above 11.5 using 1N NaOH leaving lipids, etc., behind. From 600 ml of this caustic solution, he recovers by acidification 1.9 g of the weakly-acidic fraction, for a concentration in the water of about 0.3% of the active substance. Since acidification is prompt, loss of activity is not encountered in his preparation.

Although not preferable, the procedures of both Viani and Nakatani can serve as the first stages of preparing the stable product described in this invention. The acidified product of Viani, redissolved in ether, or the acidified antioxidant of Nakatani, taken into ether, can be admixed with propylene glycol and titrated with 10% KOH to an alkaline pH, preferably about 9-10, and the ether separated from the propylene glycol phase. The solution may be filtered to remove insoluble waxes and lipids. Provided the AOS of the propylene glycol solutions was above 0.2, and water less than 75%, they would be stable. However, it should be noted that these solutions would contain only a portion of the antioxidant fractions present in the rosemary, the Viani procedure omitting the Nakatani fraction, and vice-versa, since Viani uses a preferred pH below 10.5 and Nakatani above 10.5, to secure their respective preferred fractions. The procedure described in my Example 1 includes all active antioxidant fractions and eliminates pro-oxidant factors.

The disappearance of the antioxidant activity of Viani's extremely dilute alkaline solution contradicts any obviousness of the stability of the product of this invention, which involves much higher concentrations of herbal antioxidant and organic solids. One can only speculate as to the reasons for the long-term stability of the presently-invented product, since it is customary to believe that polyphenols are unstable at elevated pH's in the presence of water, in accordance with the experience of Viani.

EXAMPLE 3

Effect of Concentration Upon Stability

The product of Example 1, pH 9.1, with an AOS of 1.42 times that of BHT, was diluted with propylene glycol, stored in glass containers in the laboratory, and the AOS measured after one and nine months. One sample was stored under refrigeration, and a second at room temperature.

Samples with an AOS of below about 0.2 were unstable. Those with an AOS of 0.2 were stable for nine months refrigerated. Those with an AOS of 0.32 did not begin to lose strength at six months at ambient temperatures.

Accordingly, an AOS of 0.2 is the lower acceptable limit of this invention. A higher strength, even 1.42 or above, is preferred, for reasons of economy. It is thus desirable to make these solutions stronger in antioxidant power than commercially available 20% BHT solutions, and they have the advantage of being water soluble, which the BHT solutions are not.

EXAMPLE 4

Effect of pH Upon Stability

The product of Example 3, with an AOS of 0.8 and adjusted to different pH's, was stored in the laboratory in bottles, and its strength measured after 16 months.

During the adjustment of pH, it was shown that the preparation was not homogeneous below a pH of about 8.4, which is taken as the lower limit of this invention. Furthermore, at a pH of 7.7, there was a loss of 31% of activity after 16 months.

Likewise, at a pH of 12.5, there was a loss of activity of 40% after 18 months. At pH's of 9.1 and 10.9, there was negligible loss (5% and 7% respectively). Accordingly, a pH of about 11.8 is taken as the upper limit of the invention. A range of about 8.7 to 11.2 is preferred, it being compatible with different concentrations of antioxidant, water, and alcohol, as well as allowing a practical range for standardization of product.

EXAMPLE 5

Criticality of Water Concentration o As mentioned in Example 2, the dilute aqueous alkaline solution of Viani was unstable, and the reasons for this are unknown.

To determine the maximum water content which would give acceptable stability, the product of Example 1, with an AOS of 1.42, and containing 1% water from the use of aqueous KOH, was diluted with water and subjected to aging tests.

It was found that less than 75% water gave acceptable stability, and that less than 50% water is preferred.

Accordingly, the critical limits of the inventive product, based on Examples 3, 4, and 5, are as follows:

|  | Range | Preferred |
| --- | --- | --- |
| AOS | 0.2 and above | above 0.4, e.g., 0.4 to 2.0 |
| pH | above 8.4 | 8.7–11.8 |
| Water content | less than 75% | less than 50% |

These ranges permit preparations suitable for many applications. All of the preparations can be added directly to water, and those of higher pH are more suitable for addition of polyphosphate solutions and to rinses of vegetables, where the acidity of the plant tissues need to be moderated. All combinations are esentially as strong or stronger than commercial 20% BHT solutions, and have the added advantage of water solubility, as well as being natural and devoid of emulsifiers.

EXAMPLE 6

Preparation of Ethanolic and Glycerine Product from Sage

Sage oleoresin was made by extraction with acetone, and the product deodorized by the method of Chang following decolorization with charcoal and removal of acetone-insoluble materials as described in Example 1.

Fifty (50) g of the resulting sage extract, containing all of the initial antioxidant materials, was agitated with 200 ml of 67% methanol at a pH of between 9 and 10, with 50 ml hexane present. The layers were separated, and the methanol washed twice more with hexane to remove residual lipids, etc.

The methanolic solution was evaporated under vacuum to remove methanol, leaving an aqueous solution of sage antioxidants at a pH of between 9 and 10. AOS was 1.07, and the antioxidants (organic solids derived from sage) being present at a concentration of about 20% by weight.

Because of instability when water content is above about 75%, a lower alcohol such as ethanol, or a polyol such as glycerine or propylene glycol, must be added to achieve stability. Although not preferred to propylene glycol, other liquids have applications where the food manufacturer does not wish to use propylene glycol in the food.

Alternatively, the refined sage extract may be mixed with glycerine at a pH of optimally 9 to 10, in the presence of hexane, and the glycerine phase containing the active principles washed sequentially with hexane to remove lipids. Precipitation may occur on cooling, which can be avoided by adding ethanol.

Other combinations will be apparent to one familiar with oleoresins and separations. The procedures work equally well with other Labiatae extracts such as thyme, marjoram, and oregano, and the products obtained thereby are equally acceptable as food-grade antioxidants.

EXAMPLE 7

The Utilization of the Alkaline Preparation in Retarding Off-flavor Development, with and without other Stabilizers The alkaline rosemary preparation of Example 1, with an AOS of 1.42, was plated onto salt at a level which would be 0.12% of the weight of the fat in pork (30% fat) and turkey (10% fat), when 1% by weight of salt was added to the meat. The meat was ground and the salt dispersion mixed in thoroughly.

Additionally, the plated product was mixed with commercial polyphosphate at the rate of two parts salt to one of phosphate, and added to the pork and turkey to give 0.5% weight of phosphate to weight of meat and 0.12% weight of rosemary product to the weight of fat of the meat.

Additionally, a control using salt alone, and a control using salt and polyphosphate alone, were made.

The patties of meat were fried and stored for two days in a refrigerator at 4° F., to simulate the development of "warmed over flavor" in commissary preparation of food.

The patties were then warmed in a microwave for two minutes, and evaluated for freshness of flavor by a trained taste panel. The freshest flavor was obtained using a mixture of the rosemary extract and polyphosphate and the warmed-over flavor was strongest in the control. The rosemary preparation and the polyphosphate, when used by themselves, were much better than the control, but not as good as the combination.

Since polyphosphate solution has a pH between 8 and 9, the alkaline rosemary, sage, etc., extract can be solubilized in the polyphosphate solution without using emulsifiers, which are often deleterious, and either pumped into or sprayed on the meat, or used as a dipping solution. This is effective in preserving color and freshness of the uncooked meat, as well as inhibiting warmed-over flavor in the cooked meat. Polyphosphate alone is not very effective in these applications as a fresh-flavor preserver.

In the case of salmon, dipping the fillets into a water solution of the alkaline rosemary extract alone has the surprising effect of inhibiting the discoloration from bright orange-red to brown, and inhibiting the development of a "fishy" aroma. Use in conjunction with polyphosphate solution is even more beneficial.

Other applications of this alkaline solution product become apparent to a food technologist, who is accustomed to using polyphosphates as a texturizing agent for meats, and as a sequestering agent for iron, which is a pro-oxidant. The sequestering action of phosphate explains why it is complimentary to the strong antioxidant powers of the natural Labiatae antioxidants.

EXAMPLE 8

Use of Product in Soft Drinks, Juices, and Other Beverages, as well as Foods

Oxidative stability is a significant problem in many of the beverages being introduced into the market, such as fresh citrus drinks and certain citrus-based soft drinks. Both rosemary and sage extracts powerfully inhibit the development of off-flavors from limonene, a major constituent of citrus flavors, and present in a majority of natural flavorings.

The product of the invention may be effectively incorporated into a fruit juice, without the aid of emulsifiers, by diluting in water and promptly injecting that into the juice with turbulence to permit the active substances to dissolve in the aqueous system at a pH of below 6, where it is expectedly stable, or it can be homogenized with the syrup sweetener and added with it. If fruit essences are used, it can be mixed with these, in which it will be soluble since these are generally alcoholic solutions.

It may also be plated on clouding agents and gums such as maltodextrins, which will slowly release it into the beverage. This is effective in keeping pickles fresh. Other ways and means of using the preparation will be apparent to food technologists, such as incorporating it into a freshly-pressed juice prior to concentration in an evaporator.

EXAMPLE 9

Use of Product in Can Coatings and Liners

Cans are made by extrusion of a metal, such as aluminum, in the presence of fatty lubricants. These lubricants are removed from the can insofar as possible, but some may remain on the inner surface. When a water-based epoxy resin is applied to the can, some of the fatty material may be desorbed and migrate to the surface, where it will remain, even after baking at 400 degrees F., and then oxidize. The oxidation products of these fats, such as 2-nonenal, are detectable at one part per billion in beer, and off-flavors often occur in canned beer which are not noticed in bottled beer.

Since the product of this invention is compatible with aqueous systems, and especially with aqueous alkaline systems which may be used in can coating, it can readily become a constituent of the liner and the fatty residue, where it will inhibit formation of off-flavors on and in the liner. At the same time, the propylene glycol or other volatile solvent, such as methanol, ethanol, isopropanol, or butanol, is evaporated, just as are the solvents for the epoxy systems. The product of Example 1, with an AOS of 1.42, may be used at a rate of 0.02% to 0.1% of the weight of the liner.

EXAMPLE 10

Specific Can Coating or Liner Production

For example, 0.1% by weight of the Example 1 product is added to a commercial can liner emulsion, consisting of water, butanol, butyl cellosolve, dimethylethanolamine, an epoxy-acrylic resin and a phosphate ester, in which it is readily dispersed. The emulsion is sprayed into a can and cured normally at about 400° F., and oxidation and off-flavor development in the can liner and subsequently of contents sealed therein is thereby inhibited, even upon long standing of the empty cans in storage before filling and sealing.

Repetition of the foregoing experiment incorporating 0.1% by weight of the antioxidant product of Example 1, or other Labiatae antioxidant preparations as disclosed herein, but especially those from sage, rosemary, and thyme, into various proprietary can-coating emulsion formulations having the approximate composition:
  85% water (containing the below-identified 19% resin material)
  7% butanol
  7% butyl cellosolve
  1% dimethylethanol amine
  19% resin material, comprising:
    epoxy-phenolic resin and/or
    epoxy-acrylic resin and
    phosphate esters
gives the same highly-desirable result of inhibiting oxidation and off-flavor development even after long standing in storage of the empty cans themselves and then of beer sealed therein and even though the can coating or liner emulsion is cured in the can at a temperature as high as 400° F.

Similar advantageous results are obtained when an alcoholic, e.g., ethanolic, Labiatae antioxidant solution with an AOS of 0.2 is sprayed upon the surface or the can coating or liner after curing the liner, and then dried.

It should be pointed out that the rosemary product is uniquely adapted to this application, because it is stable at the baking temperature of 400° F. and does not volatilize, nor does it contribute an off-flavor. The most powerful synthetic antioxidant, TBHQ, contributes both an off-flavor and does volatilize at the temperatures used in baking; BHT volatilizes even more rapidly and, because of volatization and possibly cross-linking with the resins, both are ineffective.

The unique ability of Labiatae, and expecially rosemary, antioxidants to resist degradation and volatilization at 400° F., as well as their surprising resistance to cross-linking with the epoxy resins during curing, make them novel constituents of can liners. The novel product of this invention is uniquely adapted to comprise an addition to the liner emulsion, and results in a beverage can which is uniquely resistant to off-flavor development.

Although the product of Example 1 uses KOH as a source of alkali, and is therefore suitable for any food application, it may sometimes be desirable to substitute an amine therefor in formulations for can liners. Amines are customarily used as curing agents for epoxy resins, and are alkaline. Therefore, they may replace the potassium or sodium alkalis in the product of this invention.

EXAMPLE 11

Use of Lipophilic Attractant or Scavenging Polyol Esters

Water-soluble alkaline solutions containing a polyol ester with lipophilic attractant or scavenging characteristics, e.g., polyglycerol ester solutions, act as scavengers and have the ability to "grab" or scavenge traces of lipids dissolved or emulsified in aqueous systems, thereby exposing them to direct contact with the rosemary, etc., antioxidants present in the aqueous system, and improving organoleptic stability.

For example, a solution containing 12 g of rosemary antioxidants, polyglycerol-10 esterified with caproic and capric acids (known as 10-1-cc), 25 ml of water, and titrated to pH 11 with 6 ml of 10% KOH, and having an AOS of one, was stable and dispersed easily in water.

Polyglycerols of six glycerine moities, sucrose or other sugar esters, and other fatty acids such as stearic or oleic, may be used to achieve the desired mix of hydrophobic and hydrophilic properties in the polyol ester.

Substitution of other Labiatae antioxidants, e.g., sage, marjoram, or thyme antioxidants, for the rosemary antioxidants is productive of the same desirable result of improving organoleptic stability by bringing all vestiges of dissolved lipids into contact with the natural antioxidant factor.

It is therefore seen that the present invention has provided a novel process for preparing a novel stable, water-soluble, alkaline extract of Labiatae. The novel product may contain all of the antioxidants in the parent herb, or it may contain important and even selected fractions thereof. It is essentially free of the lipids present in the crude herb extract.

The novel stable single-phase product must have an AOS of 0.2 or more, must have a pH above about 8.4, and must contain less than 75% water. It is as strong or stronger than commercial synthetic antioxidant preparations. It is preferably devoid of pro-oxidant substances, which have been selectively removed from the crude extract of the herb.

Being soluble in aqueous systems, it may be used in conjunction with polyphosphates, as rinses for meats, in juices and beverages, and in other foods in which a fatty phase is not present.

It is uniquely adapted to incorporation into can liners or coatings, where its surprising resistance to degradation at temperatures as high as 400° F. makes it the only practical antioxidant. Furthermore, it is devoid of lipids, which themselves would oxidize in the can coating or liner. Incorporation into existing can liners or coatings is accomplished with facility, as shown in the foregoing, and a further representative water-based acrylic-modified epoxy resin coating for cans, into which a stable alkaline Labiatae antioxidant may be introduced, again as indicated in the foregoing, is shown in JP Patent 01096263 A2 of Apr. 14, 1989, as abstracted in *Chemical Abstracts*, Vol. 111, Issue 20, for Oct. 2, 1989 at 176335n.

Rosemary, sage, and thyme are the preferred Labiatae and, of these, rosemary is especially preferred.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. A process of preparing a stable alkaline solution of Labiatae antioxidants essentially free of lipids comprising the steps of:
   (1) extracting a Labiatae herb with an organic solvent, (2) decolorizing the extract with an absorbent, (3) removing acetone-insoluble materials and absorbent therefrom by filtration at about ambient temperature using an excess of acetone, deodorizing the product, (4) agitating said solvent extract of the herb from step 3 with an aqueous alkaline lower-aliphatic alcoholic or polyol or alkaline water solution thereof, (5) separating the aqueous phase from the upper insoluble phase by the effect of gravity thereby concentrating lipids in the insoluble phase and then removing said insoluble phase, and (6) concentrating and adjusting the alkaline phase to less than about 75% water in the solvent to give a stable solution having an antioxidant strength (AOS) of above about 0.2 when compared with a BHT standard having an AOS of one (1) and a pH above about 8.4 and below about 11.8, which does not lose its antioxidant strength (AOS) at ambient temperatures for at least six months.

2. The process of claim 1, wherein step 4 is conducted in the presence of a water-immiscible solvent.

3. The process of claim 1, wherein the herb is selected from the group consisting of rosemary, sage, and thyme.

4. A process for preparing a stable alkaline solution containing essentially all of the antioxidant principles of a Labiatae extract and essentially free of lipids, comprising (1) extracting a Labiatae herb with an organic solvent, (2) decolorizing the extract with an absorbent, (3) removing acetone-insoluble materials and absorbent therefrom by filtration at about ambient temperature using an excess of acetone, deodorizing the product, (4) preparing a solution of the extract from step 3 in a medium selected from the group consisting of an aqueous alkaline lower-aliphatic alcohol and a polyol media by admixing the organic solvent extract of the herb with such alkaline solution, (5) removing insoluble lipids and resins by separation and removal of an upper fat phase containing the same, (6) concentrating and adjusting the aqueous alkaline phase to provide a stable solution having a pH above about 8.7 and below about 11.2, a water content of less than 75%, and an antioxidant strength (AOS) of above about 0.2 when compared with a BHT standard having an AOS of one (1), which stable solution does not lose its antioxidant strength (AOS) at ambient temperatures for at least six months.

5. The process of claim 4, wherein step 4 is conducted in the presence of a polyol medium comprising a polyol ester wherein the polyol ester is a polyglycerol ester, a sugar ester, or a fatty acid ester.

6. The process of claim 4, wherein the medium for Step 4 comprises propylene glycol, glycerine, ethanol, or a mixture of more than one thereof.

7. The process of claim 6, wherein the herb is selected from the group consisting of rosemary, sage, and thyme.

8. A stable liquid alkaline Labiatae herb antioxidant solution prepared according to the method of claim 7.

* * * * *

UNITED STATES PATENT AND TRADEMARK OFFICE
CERTIFICATE OF CORRECTION

PATENT NO. : 5,209,870

DATED : May 11, 1993

INVENTOR(S) : Paul H. Todd, Jr.

It is certified that error appears in the above-identified patent and that said Letters Patent is hereby corrected as shown below:

Title page, column 1, References Cited, U. S. PATENT DOCUMENTS,
    5th listing; "5/1977" should read -- 3/1977 --.
Column 10, line 44; delete "o" and begin a new line and
    paragraph with "As".

Signed and Sealed this

Twenty-ninth Day of March, 1994

*Attest:*

BRUCE LEHMAN

*Attesting Officer*     *Commissioner of Patents and Trademarks*